July 8, 1941.   A. S. LEONARD ET AL   2,248,365
METHOD OF SHELLING NUTS
Filed Feb. 27, 1940   3 Sheets-Sheet 3
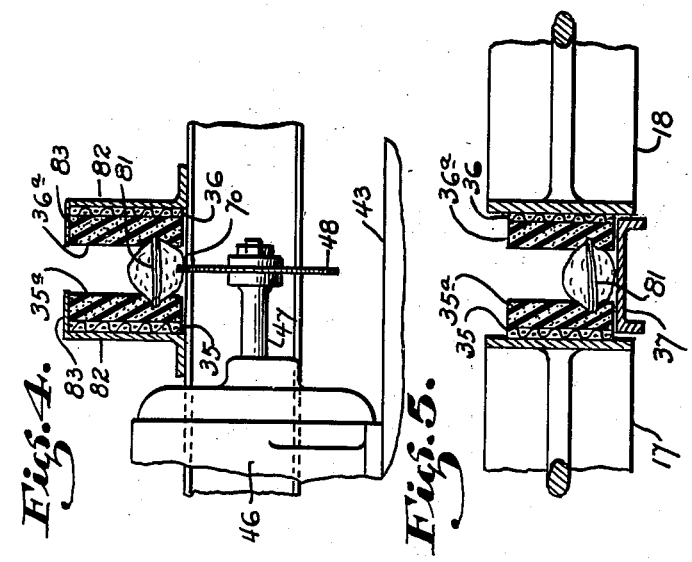
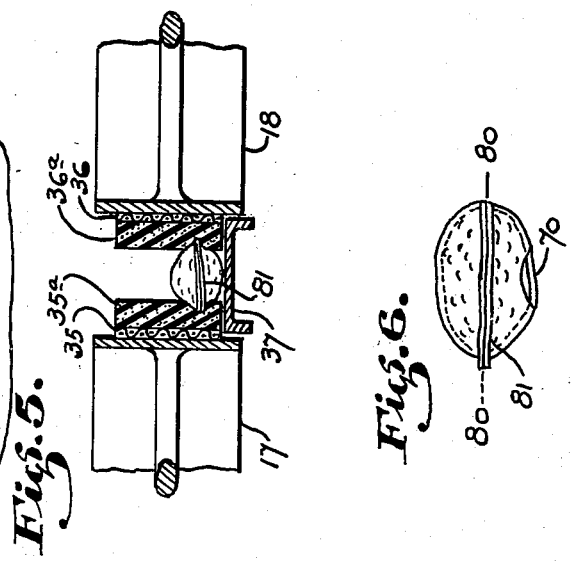
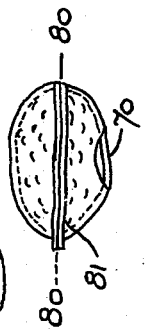
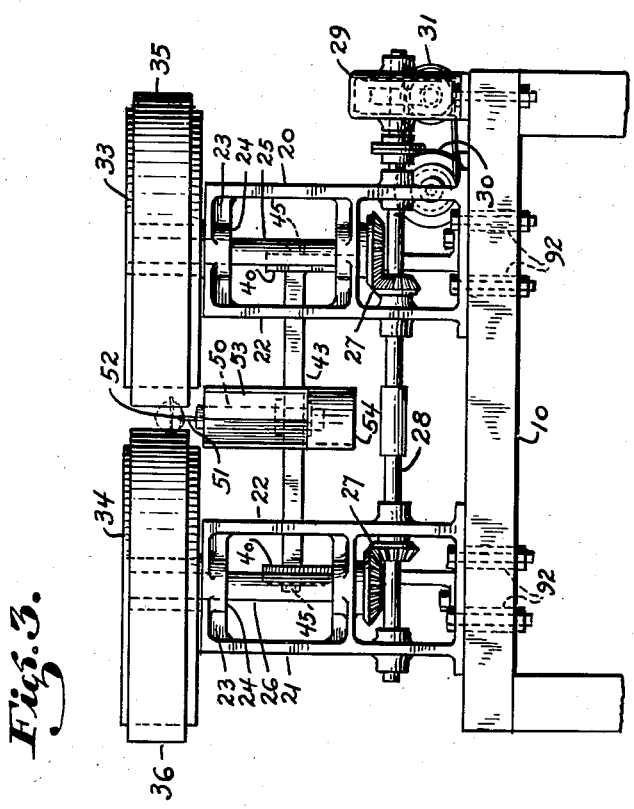
INVENTORS.
Arthur S. Leonard,
Harry B. Walker.
BY Chas. E. Townsend.
ATTORNEY Patented July 8, 1941

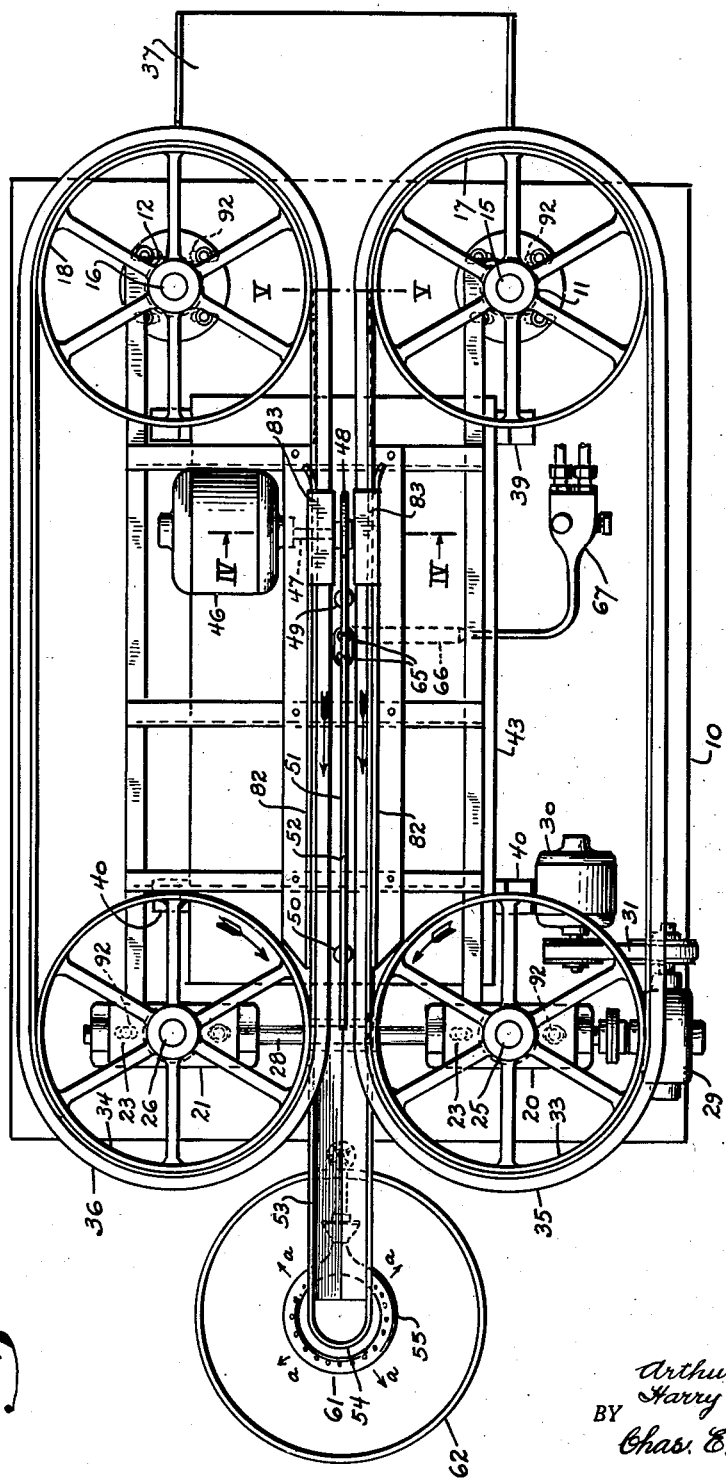

2,248,365

UNITED STATES PATENT OFFICE 2,248,365

METHOD OF SHELLING NUTS

Arthur S. Leonard, Berkeley, and Harry B. Walker, Davis, Calif., assignors to The Regents of the University of California, Berkeley, Calif., a corporation of California Application February 27, 1940, Serial No. 321,020

5 Claims. (Cl. 146—219)

This invention relates in general to the art of breaking and removing the hard outer covering of a nut, or similar object, and particularly to a method for shelling nuts in which combustion of an explosive fluid mixture is utilized to break and remove the hard shell therefrom. The present joint application is for the same invention as that set forth and claimed in the co-pending sole application of Harry B. Walker, filed November 14, 1938, Serial No. 240,223, entitled "Method and apparatus for shelling nuts."

In the past, various types of mechanical devices have been devised to remove the shells from nuts, such as walnuts, but they have generally proved unsatisfactory. Such prior devices have generally been operated to apply a compressive force to the external surface of the nut shell to break the shell, and separate means have been provided for separating the shell from the kernel. The operation of such devices has been slow, inefficient and impractical, it being impossible to provide a suitable breaking pressure for nut shells of varying degrees of hardness, with the undesirable result that the kernels of the nuts are frequently broken or damaged. It is therefore a primary object of this invention to provide a method for continuously shelling nuts at a high rate of speed and without damaging the kernels thereof.

It has been found that by applying a substantially uniform, outwardly directed force on the interior surface of a nut shell, the shell can be broken and removed from the nut without damaging the kernel therein. In the operation of this method, it has been possible to remove the shells from over sixty per cent of the nuts treated thereby, without damaging or breaking the kernel. It is therefore a further object of this invention to provide a method for subjecting the shell of a nut to a suddenly applied outwardly directed pressure differential sufficient to break the shell and remove it from the nut kernel within.

Another object of the invention is to provide a method for breaking or removing a shell from a nut which consists in perforating the nut, introducing a combustible fluid into the nut through the perforation, and then igniting the mixture to break and remove the shell.

A suitable type of apparatus which has been successfully employed in carrying out this method is shown in the accompanying drawings, which are submitted for purposes of illustration only, as the apparatus forms the subject matter of a co-pending application. In the drawings, Fig. 1 is an elevational view partly in section of the apparatus;

Fig. 2 is a plan view of the apparatus shown in Fig. 1, showing the hood 75 removed;

Fig. 3 is an end view of the machine looking at the discharge end thereof, said view showing the ring burner and hood 75 removed;

Fig. 4 is an enlarged cross-section taken on line IV—IV of Fig. 2;

Fig. 5 is an enlarged cross-section taken on line V—V of Fig. 2; and

Fig. 6 is a side elevation of a walnut showing the manner in which it is cut by the saw.

Figure 1:
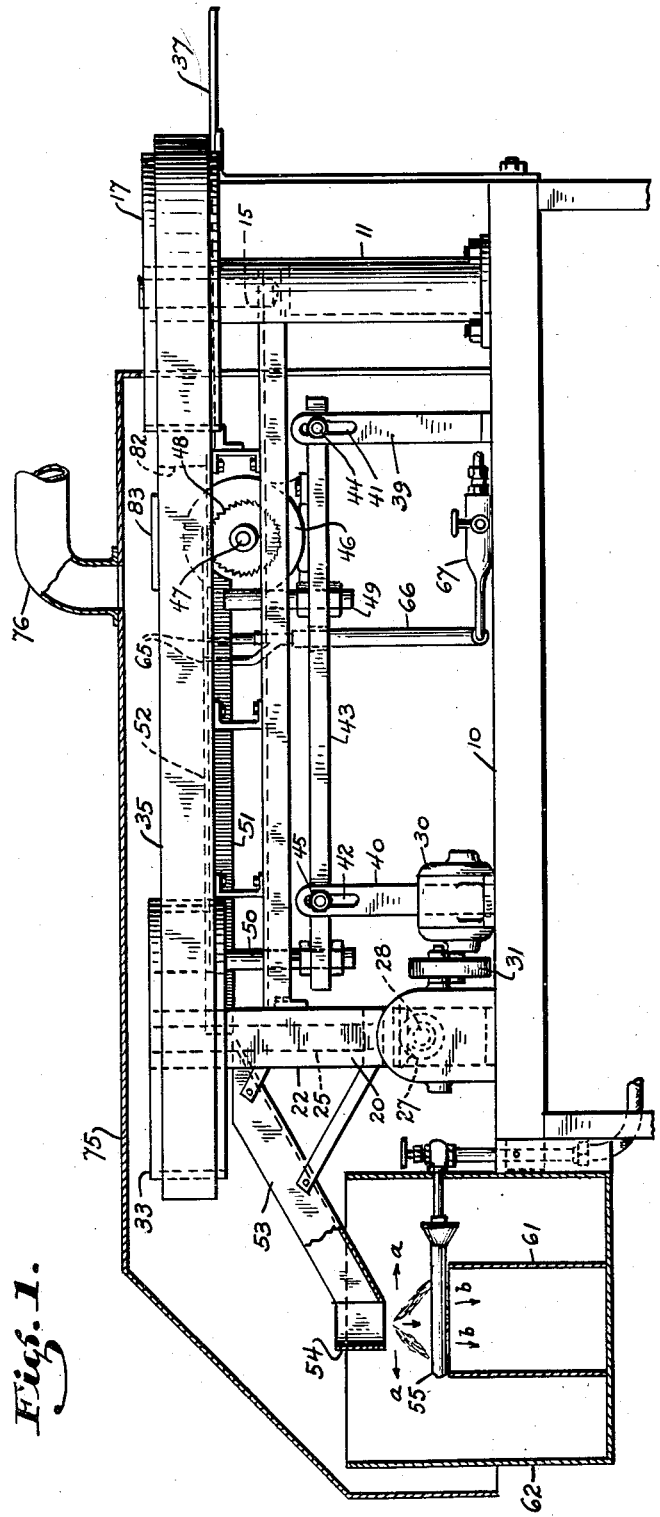

Referring to the drawings, a support 10 is shown, which may be a table or bench or other suitable supporting surface having rigidly secured thereto vertically disposed supporting columns 11 and 12, respectively, having their upper ends drilled to journal axles 15 and 16 of flat pulley wheels 17 and 18.

Secured to the other end of the support 10 are similar upright supports 20 and 21, shown in detail in Fig. 3, and which are aligned with the supporting columns 11 and 12 as shown in Fig. 2. The upright supports 20 and 21 are each formed with an open frame 22 suitably secured to the support 10, each frame having a top cross bar 23 which supports a bearing 24. Journaled in the bearing 24 of the upright support 20 is a shaft 25, and journaled in the bearing 24 of the upright support 21 is a shaft 26, each of the shafts being connected through suitable bevel gearing 27 to a transverse shaft 28 which is connected, through a reduction gear box 29 of the type well known in the art, to an electric motor 30 by a suitable belt and pulley structure 31. The upper end of the shaft 25 has rigidly fixed thereto a drive pulley 33, and the shaft 26 has fixed thereto a second drive pulley 34. The drive pulley 33 is operatively connected to the pulley wheel 17 by a flat belt 35, and the drive pulley 34 is connected to the pulley wheel 18 by a flat belt 36. The belts 35 and 36 are identical in construction and may be formed from any suitable material. Each belt is faced with sponge rubber such as indicated at 35a and 36a, or with a similar material, to permit nuts when placed between them to be resiliently gripped and at the same time firmly held. As will be noted, the parts are so arranged that the adjacent faces of the belts 35 and 36 are parallel and spaced apart a distance such that a nut, for example a walnut, may be introduced therebetween from a feed table 37 disposed directly below the belts. It is also to be noted that the bevel gearing 27 for the drive pulleys 33 and 34 is so arranged, as is well known in the art, to rotate the drive pulleys in opposite directions so as to move the adjacent portions of the belts 35 and 36 in the same direction.

Also secured to the support 10 are standards 39 and 40 having slots 41 and 42 therein, respectively. Connected to the standards 39 and 40 and supported thereby is a sub-base 43 having suitable bolts which project through the slots 41 and 42, being secured to the standards by means of nuts 44 and 45 provided therefor. It is to be noted that by loosening the nuts 44 and 45, the sub-base 43 may be raised or lowered to any desired height within the limits of the slots 41 and 42. Fixed to the sub-base 43 is an electric motor 46 having a drive shaft 47, on the end of which is secured a circular saw member 48 of the type well known in the art. Also secured to the sub-base 43, as by bolts 49 and 50, is a track element 51 which, as shown in Figs. 1 and 2, extends from a point adjacent the circular saw member 48 to a point substantially between the shafts 25 and 26. The track element 51 is provided with a longitudinal bead 52 which extends the length thereof. It will be noted that the circular saw member 48 and the longitudinal bead 52 are in alignment and are positioned approximately midway between the adjacent portions of the belts 35 and 36. Connected to the left end of the track element 51, as seen in Figs. 1 and 2, is a chute member 53 inclined downwardly therefrom and which may be made either V-shaped or semi-cylindrical. The end of the chute member 53 is provided with a semi-circular guard plate 54 which is positioned directly above an ignition means generally designated at 55.

A plurality of upwardly venting ports 65 are provided in the longitudinal bead 52, and, as shown in Fig. 1, are connected by suitable piping 66 to a source of combustible fluid, not shown. It has been found desirable to use a combustible fluid comprising acetylene and oxygen in a suitable mixture, and to provide a mixing valve 67 in the line of the piping 66 in which the oxygen and acetylene may be mixed in suitable proportions, but it is to be understood that the invention is not limited to the use of such a combustible fluid, and that therefore it may be desirable to dispense with the mixing valve 67 if some other type of fluid is employed.

In operation, the electric motor 30 is energized to rotate the drive pulleys 33 and 34 so as to move the adjacent portions of the belts 35 and 36 in a direction toward the chute member 53. The electric motor 46 is also energized so as to rotate the circular saw member 48 at high speed. Nuts, such as walnuts, are then introduced in sequence from the feed table 37 and are engaged by the belts 35 and 36 and carried therebetween into contact with the circular saw member 48 which cuts a shallow slot 70 therein, as shown in Fig. 4. The nuts are then conveyed onto the track element 51, the longitudinal bead 52 entering and closing the slot 70 so as to temporarily seal the slot in each nut. The combustible fluid, such as a mixture of acetylene and oxygen, as above mentioned, is conveyed through the piping 66 to the ports 65, and as each nut passes over these ports it receives a charge of the combustible mixture, the slot immediately thereafter being again sealed by the longitudinal bead 52 for the balance of the travel of the nut along the track element 51. As each nut comes to the end of the track element 51, it falls free of the belts 35 and 36 into the downwardly directed chute member 53, hitting the semi-circular guard plate 54 and then dropping vertically downward into the flame maintained by the ring burner 55. As each nut enters the upper zone of the flame, the combustible fluid mixture in the nut is ignited. An explosion of sufficient force to shatter the shell immediately takes place, with the result that the shell bursts into fragments which are thrown outwardly in the direction of arrows a (see Fig. 1), while the meat or kernel of the nut is left intact and drops down in the direction of arrow b through the ring burner into a receptacle 61. An exterior container 62 receives the shell fragments, and a comparatively clean separation of shell fragments and kernels results. Final cleaning of the kernels to remove any foreign matter is thus readily accomplished.

In actual practice, a small quantity of gas will escape from the ducts 65 whenever they are uncovered by the nuts. Also, a small quantity of gas will escape from the nuts themselves as they roll or slide down the trough 53. To prevent any ill effect or annoyance to the operators, a hood 75 is extended over the machine. This hood is connected through a pipe 76 with the suction side of a blower, not here shown. A continuous suction is thus maintained under the hood, which will insure continuous removal of the escaping gas and also the products of combustion from the burner ring, and a clean, uncontaminated atmosphere is thus maintained about the machine.

While the slot or cut made in each nut by the circular saw may be made in any part of the shell, it is preferable to feed or deliver the nuts between the belts with the longitudinal axis indicated by the dotted line 80—80 (see Fig. 6) pointing in the direction of travel of the belts. Also it is preferable that the ridge 81 surrounding the nut should assume a substantially horizontal position, as shown in Figs. 4 and 5, as the thinnest portion of the shell will in this manner be presented to the saw. Obviously, if the nut were presented so that the saw would have to cut through the ridge, more resistance would be encountered, and while it is not of great importance one way or another, it would be preferable to feed the nuts in the manner described. Plainly speaking, the nuts may be fed between the belts in any position, as, no matter how they are presented to the saw, the saw will slit them. In fact, one of the features of the machine is that exact positioning of the nuts is not necessary. In the present instance, the nuts are hand-fed from the feed table. Hence it is important that, no matter how the nuts are received, the saw must act on them, but obviously as an operator becomes experienced, positioning of the nuts to proper advantage will sooner or later become a habit.

It has been previously stated that the sub-base 43 which supports the saw and the track element 51 is adjustable so that the saw may be adjusted to regulate the depth of the cut in the shell of the nut. As this is the case, it is also essential that the nuts, when fed between the belts, be properly positioned with relation to the saw or, in other words, the nuts must assume a fixed position with relation to the saw when they pass the same, as adjustment of the saw would otherwise be to no avail. The feed table assures such positioning; that is, the feeder merely pushes the nuts along the table surface until they are gripped between the belts. Thus, the lower face of each nut is maintained at a fixed elevation with relation to the saw, and the saw can be raised or lowered to increase or decrease the depth of the cut.

When a nut is engaged by the saw, there is an upward thrust. Hence, means must be provided for preventing upward movement of the belts and the nuts gripped between them as they pass under the saw. This is accomplished by providing side guides 82 and flange guides 83 (see Figs. 2 and 4). These side guides extend from a point adjacent the saw to a point adjacent the discharge end of the machine, as shown in Fig. 2. The flange guides 83 are disposed at a point adjacent the saw. These flanges prevent an upward thrust of the belts and nuts when passing the saw, while the remaining portions of the side guides prevent spreading of the belts until the point for discharging the nuts is reached.

Although a hand feed has been described, an automatic feed may obviously be employed. The faster or more rapidly the nuts are fed, the better the machine operates, as the escape of gas from the orifices 65 will be reduced, as will the escape of gas from the nuts after they have been charged with gas.

In actual practice the pulley supports 11—12 and 20—21 will be laterally adjustable to vary the spacing between the parallel belts so that nuts of varying size may be accommodated. This lateral adjustment is very desirable, since it requires considerable lateral pressure from the rubber-faced belts against the nuts to hold them sufficiently rigid while they are being cut by the saw. If a very large nut should be followed by a small nut, there would obviously be difficulty. Accordingly, in a cracking plant the nuts would be graded to size and the machine would be adjusted to the required distance between the parallel belts to insure sufficient pressure to hold the nuts rigid during the sawing operation. Lateral adjustment may be obtained in various ways, a simple method being to form slots 92 in the table 10 or in the flanges of the bearing standards through which the fastening bolts extend, these slots being of sufficient length to permit the required lateral adjustment.

While certain features of the present invention have been more or less specifically described and illustrated, it is nevertheless to be understood that changes may be resorted to within the scope of the appended claims.

Having thus described and illustrated the invention, what we claim and desire to secure by Letters Patent is:

1. A method of breaking the shell of a nut including the steps of: introducing an explosive in gaseous form inside the shell of the nut in the space between the kernel and the shell, and immediately thereafter igniting the explosive to explode the same and burst the shell without substantially injuring the kernel.

2. A method of breaking the shell of a nut including the steps of: perforating the shell so as to form an opening communicating with the interior thereof, introducing an explosive gas mixture into the shell through the opening into the space between the kernel and the shell, and immediately thereafter igniting the gas mixture to explode the same and burst the shell without substantially injuring the kernel.

3. A method of breaking the shell of a nut including the steps of: perforating the shell so as to form an opening communicating with the interior thereof; introducing an explosive gas mixture into the shell through the opening into the space between the kernel and the shell, substantially sealing said opening for a short period to prevent the escape of the gas mixture through said opening, and immediately thereafter igniting the gas mixture to explode the same and burst the shell without substantially injuring the kernel.

4. The method of shelling nuts which comprises cutting an opening in the shell, introducing an explosive gas mixture into the shell through the opening into the space between the kernel and the shell, preventing escape of the gas mixture through said opening, and immediately thereafter igniting the gas mixture to explode the same and burst the shell without substantially injuring the kernel.

5. A method of shelling a nut which comprises perforating the shell to form an opening communicating with the interior of the shell, introducing an explosive gas mixture through said opening into the space between the shell and the kernel, and immediately thereafter passing the nut through a flame area to ignite the gas and to explode and burst the shell without substantially injuring the kernel.

ARTHUR S. LEONARD.
HARRY B. WALKER.